A. BULLOCK.
Harvester.
No. 16,079.
Patented Nov. 11, 1856.
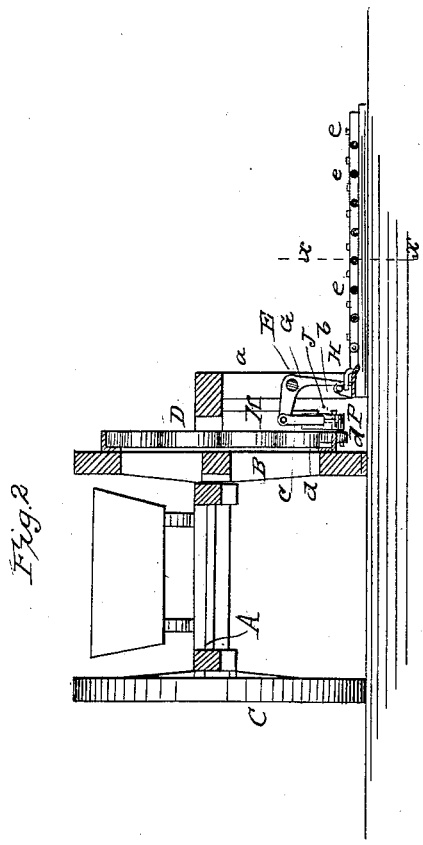
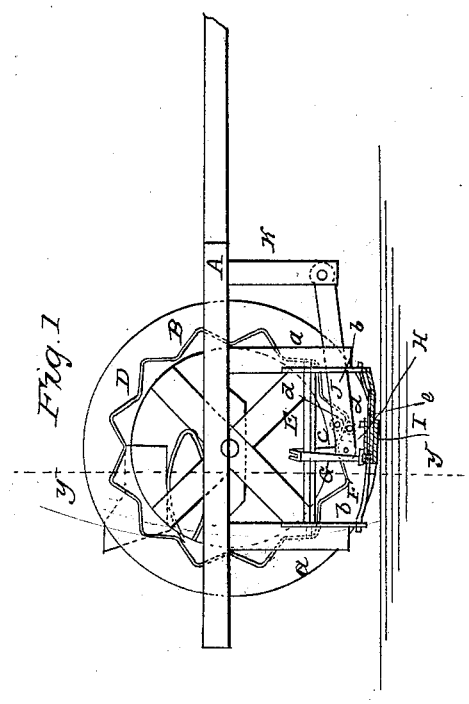

UNITED STATES PATENT OFFICE.

ALVIN BULLOCK, OF BUSTI, NEW YORK.

IMPROVEMENT IN HARVESTERS.

Specification forming part of Letters Patent No. 16,079, dated November 11, 1856.

*To all whom it may concern:*

Be it known that I, ALVIN BULLOCK, of Busti, in the county of Chautauqua and State of New York, have invented a new and useful Improvement in Grain and Grass Harvesters; and I do hereby declare that the following is a full, clear, and exact description of the same, reference being had to the annexed drawings, making a part of this specification, in which—

Figure 1 is a side view of the main frame of my improvement, the sickle being bisected transversely, as shown by the dotted line $x\ x$, Fig. 2. Fig. 2 is a longitudinal vertical section of the same, $y\ y$, Fig. 1, showing the plane of section.

Similar letters of reference indicate corresponding parts in the two figures.

To enable those skilled in the art to fully understand and construct my invention, I will proceed to describe it.

A represents the main frame of the machine, said frame being of rectangular form and supported by two wheels, B C, one of which, B, is the driving-wheel.

To the outer side of the rim of the wheel B a zigzag flange, D, is attached. This flange projects outward at right angles from the wheel, as shown in Fig. 2.

To one side of the main frame A two pendants, $a\ a$, are attached, and between the lower ends of the pendants a shaft, E, is placed, the shaft being allowed to turn freely between the pendants.

To the lower end of each pendant a plate, $b$, is attached, and the ends of a flat concave bar, F, are fitted in the plates, the ends of said bar being allowed to turn in the plates.

The shaft E has a bent or right-angled lever, G, upon it, the lower end of which is fitted in a slot or opening at the end of the cutter-bar H. The cutter-bar rests and works upon a finger-bar, I, one end of which is attached to the center of the concave bar F, and as this bar F is allowed to turn between the plates $b\ b$ it will be seen that the finger-bar is allowed to rise and fall, or that it may conform to the inequalities of the ground.

The upper end of the bent or right-angled lever G is pivoted in an upright bar, C, which is pivoted to one end of a lever, J. The opposite end of this lever is pivoted in the lower end of a pendant, K, which is attached to the main frame A. To the inner side of the lever J rollers $d\ d$ are attached, and these rollers are fitted one over the zigzag flange D and the other below it, the flange working between the two, as plainly shown in Fig. 2.

The cutters $e$ of the sickle are pivoted to the finger-bar I and work over the fingers $f$, similar to shears, the back ends of the cutters passing through holes in the bar H.

From the above description it will be seen that as the machine is drawn along the zigzag flange D will operate the lever J, giving it a vertical vibratory movement, and the bent or right-angled lever G will also be operated or vibrated, so that a reciprocating motion is given the cutter-bar H.

The above improvement is extremely simple, operates well and with but little friction, the lever J causing the driving device to operate smoothly.

Having thus described my invention, what I claim as new, and desire to secure by Letters Patent, is—

Operating the sickle-bar H by means of the right-angled lever G on the shaft E, in combination with the lever J, bar $c$, and flange D, when the same are constructed and arranged to operate in relation to the main frame A, drive-wheel B, and adjustable finger-bar I, in the manner and for the purpose set forth.

ALVIN BULLOCK.

Witnesses:
 ORREL GREEN,
 JACOB PETERSON.